(12) United States Patent
Watarai et al.

(10) Patent No.: US 6,677,035 B1
(45) Date of Patent: Jan. 13, 2004

(54) PAINT COMPOSITION FOR USE WITH RESIN MOLDING PRODUCTS

(75) Inventors: Hiroshi Watarai, Ichinomiya (JP); Yasuhiko Ogisu, Nagoya (JP); Yasuhiro Nakano, Hirakata (JP); Makoto Hashimoto, Hirakata (JP)

(73) Assignees: Toyoda Gosei Co., Ltd., Aichi-ken (JP); Nippon Bee Chemical Co., Ltd., Osaka (JP)

( * ) Notice: Subject to any disclaimer, the term of this patent is extended or adjusted under 35 U.S.C. 154(b) by 95 days.

(21) Appl. No.: 09/654,265

(22) Filed: Sep. 1, 2000

(30) Foreign Application Priority Data

Sep. 16, 1999 (JP) .............................. 11-261897

(51) Int. Cl.⁷ ................................. B32B 5/02
(52) U.S. Cl. ................... 428/331; 428/522; 428/688; 524/451
(58) Field of Search ............... 524/451; 428/522, 428/411.1, 688, 331

(56) References Cited

U.S. PATENT DOCUMENTS

| | | | | |
|---|---|---|---|---|
| 3,652,313 A | * | 3/1972 | Nagata et al. | 106/174.1 |
| 3,841,888 A | * | 10/1974 | Belde et al. | 106/173.01 |
| 3,896,065 A | * | 7/1975 | Reardon et al. | 524/446 |
| 3,980,602 A | * | 9/1976 | Jakubauskas | 524/431 |
| 4,243,430 A | * | 1/1981 | Sperry et al. | 524/407 |
| 4,263,352 A | * | 4/1981 | Kaltenbach et al. | 427/379 |
| 5,968,655 A | * | 10/1999 | Hartung et al. | 428/423.1 |

* cited by examiner

*Primary Examiner*—D. Lawrence Tarazano
(74) *Attorney, Agent, or Firm*—Posz & Bethards, PLC

(57) ABSTRACT

A paint composition for use in a resin molding product prevents the appearance of coating film sink marks caused by unevenness of the coated surface by incorporating a coloring pigment and an extender pigment into the paint composition. The coloring and extender pigments are present in the paint composition in a total pigment weight concentration (PWC) of less than 30%.

12 Claims, 2 Drawing Sheets

PAINT COMPOSITION FOR USE WITH RESIN MOLDING PRODUCTS

Priority is claimed based on Japanese patent application No. Hei 11-261897 filed on Sep. 16, 1999, the complete disclosure of which is incorporated herein by reference.

BACKGROUND OF THE INVENTION

1. Field of the Invention

The present invention relates to a paint composition containing a coloring pigment, and in particular a paint composition for forming a coating layer on a product molded from resin (hereinafter "a resin molding product"). The present invention is especially useful as a metallic paint that contains an inorganic coloring pigment comprising, for example, aluminum foil, although the paint composition of this invention can also be applied as a non-metallic coating containing organic pigments. Representative resin molding products to which the paint composition of this invention can be applied include bumpers, mat guards, and air bag pads for interior components, such as instrument panels and door panels.

2. Description of Related Art

Metallic coated products are predominantly adopted as side moldings for automobiles to attain aesthetic harmony between the side moldings and the sheet metal of a vehicle body exterior. Generally, the metallic coated products are made by applying a metallic paint directly onto a molded main body, with no primer layer, to form a metallic coating layer. Then, a clear coating layer comprising a clear paint is formed on the metallic coating layer. This procedure is preferred due to the high productivity that it attains.

Referring to FIG. 1, integrally molded mounts in the form of a plurality of ribs 18 are disposed on both ends of the back face of the molding main body 12 in order to press and adhere a double coated tape 20 reliably to the sheet metal of a vehicle (not shown). In FIG. 1, reference numeral 22 denotes a shiny molding piece having a decorative metal foil.

It has been found that unevenness in the surface of the molding main body 12 can cause an uneven luster to develop (typically as sink marks) in the coating film, thus adversely affecting the overall appearance of the design surface of the molding main body 12. Although the ribs 18 serve to reduce the appearance of sink marks somewhat, luster unevenness remains despite the ribs 18, particularly when the coloring pigment is an inorganic pigment.

SUMMARY OF THE INVENTION

It is an object of the present invention to provide a paint composition that can be applied to a resin molding product and a coated resin molding product to effectively color the product while reducing the luster unevenness.

In accordance with the principles of this invention, the above and other objects are attained by the provision of a paint composition for use with a resin molding product, which paint composition comprises a coloring pigment and an extender pigment present, collectively, in the paint composition at a total pigment weight concentration (PWC) of less than 30%. A paint composition satisfying these features produces a coating film having an even luster (no coating film sink marks), even when the coating film is disposed over a resin molding product having sink marks in its surface.

As referred to in this specification and the appended claims, the term "PWC" is an abbreviation of "pigment weight concentration" and means the total weight of the pigments of the paint based on the total weight of the solid ingredients of the paint (coating film).

In the embodiment described above, the paint composition is particularly effective (even in small amounts) in reducing luster unevenness in the coating film where an inorganic pigment is selected as the coloring pigment, and silica (silicon dioxide) or talc (magnesium silicate), especially silica, is selected as the extender pigment.

Additional objects of this invention include the provision of a coated resin molding product comprising a resin molding product coated with a coating film prepared from the paint composition, and the provision of a method for use of the paint composition to create a coating layer on a resin molding product.

Other objects, aspects and advantages of the invention will be apparent to those skilled in the art upon reading the specification and appended claims which, when read in conjunction with the accompanying drawings, explain the principles of this invention.

BRIEF DESCRIPTION OF THE DRAWINGS

The accompanying drawings serve to elucidate the principles of this invention by illustration. In such drawings.

DETAILED DESCRIPTION OF THE PREFERRED EMBODIMENTS

Figure 1:
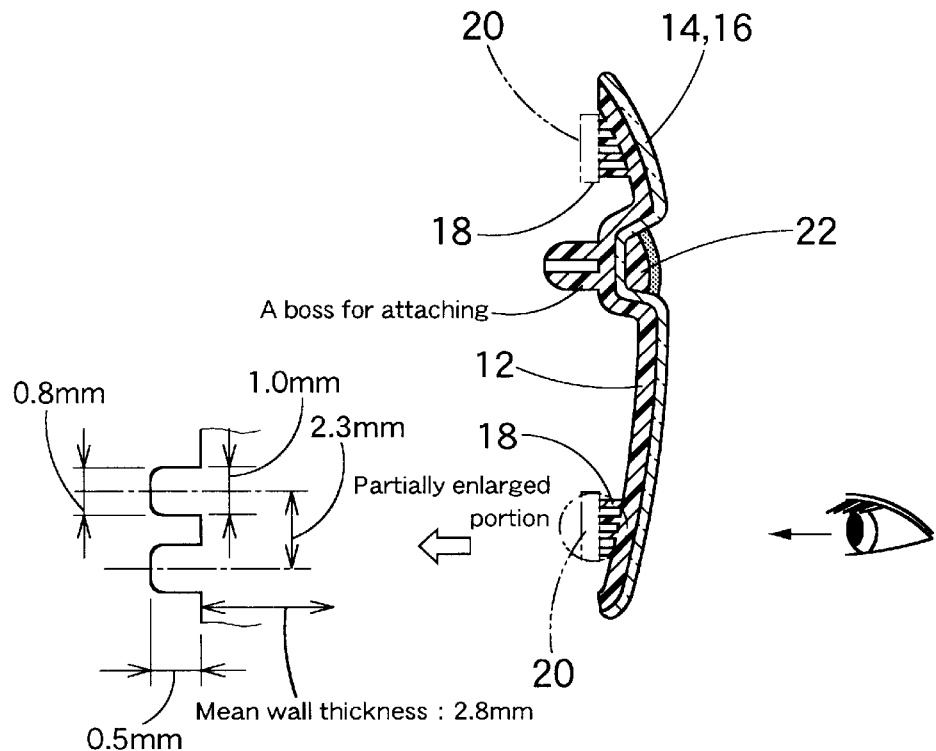
FIG. 1 is a cross-sectional view of a side molding showing an example of a resin molding product to which the paint composition according to the invention is applied.

An explanation and description of the embodiments shown in the drawings will be given below. In this detailed description, units for the blending proportions are set forth in weight basis unless otherwise specified.

The paint composition for forming a coating film on a resin molding product according to the invention comprises at least one coloring pigment and at least one extender pigment. The pigments are present in the paint composition in a total pigment weight concentration (PWC) of less than 30 wt %. The extender pigment is contained together with the coloring pigment so as not to cause uneven luster (coating film sink marks) on the coated surface.

In the event that the paint composition is to be applied to resin molding products for automobiles, the resin molding products are preferably polyolefinic molding products prepared from resins such as PP (polypropylene), PE (polyethylene), and copolymers thereof (such as a polyallomer) capable of easily providing relatively light weight molding products and having excellent heat resistance and impact shock resistance. Other suitable resins for preparing molding products (e.g., automobile parts) that can be used with the paint composition of this invention include polar thermoplastic resins, such as AS resins, ABS resins, methacrylic resins (PMMA), saturated polyester resins, and polyamides (PA). In addition, thermosetting resins such as unsaturated polyesters, urea resins and melamine resins may also be used to prepare resin molding products suitable for use with the paint composition of this invention.

In the event that the paint composition of this invention is to serve as a metallic coating, the coloring agent can be, for example, a mixture based on an aluminum (Al) foil, and/or various other kinds of inorganic/organic coloring pigments.

The effect of the invention (i.e., of preventing coating film sink marks) is more remarkable when applied to a paint composition in which the coloring pigment is an inorganic pigment. This result is particularly unexpected, since in conventional paint compositions inorganic coloring pigments tend to permit the show-through of more coating film sink marks than organic coloring pigments.

Representative inorganic coloring pigments that can be used in the coating composition of this invention include one or more of the following, selected alone or in various combinations: metallic oxides, such as titanium (IV) oxide, chromium (III) oxide, zinc oxide, iron (III) oxide, nickel titanium yellow, and the like; metallic sulfides, such as mercury (II) sulfide, mercury cadmium sulfide, cadmium yellow, and the like; metallic chromates, such as chromium yellow (yellow lead), zinc yellow, and the like; ferrocyanates, such as Prussian blue; and others, including ultramarine, metal foil such as Al foil, mica powder and carbon black.

Representative organic coloring pigments that can be used in the coating composition of this invention include one or more of the following, selected alone or in various combinations: azo pigments; phthalocyanine pigments; metal complex salt pigments; triphenyl methane pigments; quinacridone pigments; and isoindolinone pigments.

Increasing the total pigment weight concentration (PWC) to 30% or more improves the ability of the paint composition to hide the color of the substrate, but brings about an undesired effect on the adhesive properties of the coating film. Hence, maintaining PWC below 30% is desired for preventing the coating film from peeling away from an attached substrate.

In addition to pigments, the paint composition of this invention preferably includes one or more base resins, such as polyester resins. Representative examples of suitable base resins include an acryl-urethane resin (preferably having a Mw of 60,000 to 80,000), a chlorinated resin (preferably having a chlorinated degree of 22–25%), and/or an acrylpolyol resin (preferably having a Mw of 30,000 to 50,000).

The effect of the invention in preventing coating film sink marks is remarkable, especially for paint compositions having a total pigment weight concentration PWC of less than 25% and, more preferably, less than 20%, since such low pigment weight concentrations in conventional compositions tend to form coating film sink marks when coated over substrates with uneven surfaces.

Although the paint composition of this invention is primarily described as a metallic paint, it should be understood that the paint composition can undertake other embodiments, including as a solid paint.

The paint composition of this invention has as one of its advantages the ability to avoid the appearance of an uneven luster (coating film sink marks), even when coated over an uneven substrate surface. This advantage is accomplished by incorporating an extender pigment and a coloring pigment into the paint composition.

Extender pigments generally comprise a white pigment having a low refractive index. When used alone, extender pigments make significantly no contribution to hiding the color of black and white substrates. Due to the low hiding ability of extender pigments, those of ordinary skill in the art generally consider the incorporation of extender pigments into a coating film to make no contribution to the hiding of sink marks. However, the present inventors have found that when the extender pigment is used in combination with a coloring pigment in the paint composition of this invention, a remarkable effect is realized in the inhibition of luster unevenness. Also, the extender pigment improves the fluidity, strength and optical characteristics of the paint composition.

Figure 2:
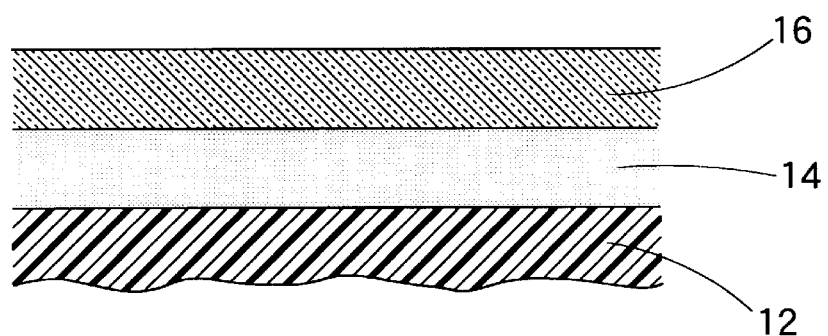
FIG. 2 is an enlarged cross sectional view of the coating film shown in FIG. 1.
Figure 3:
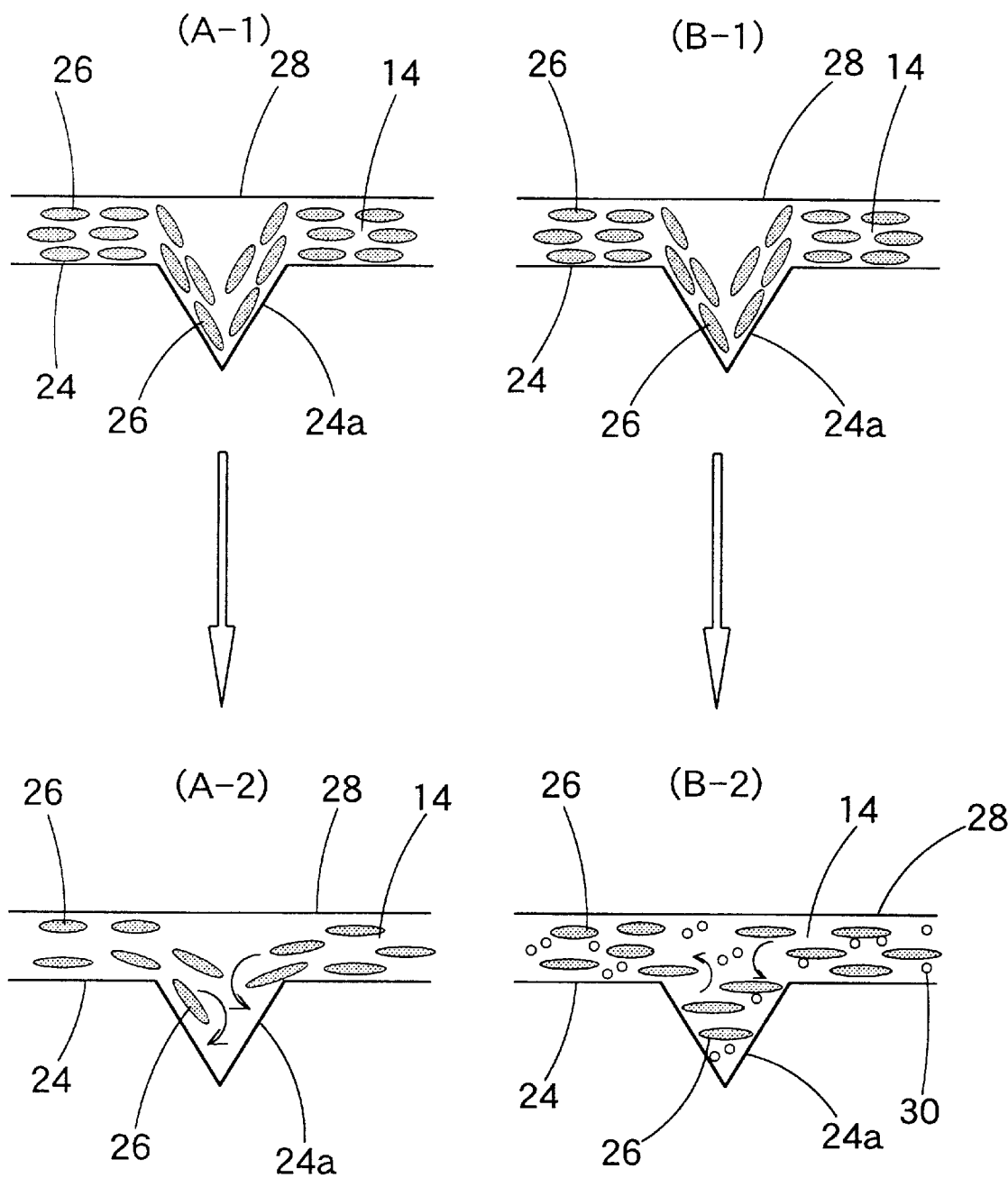
FIG. 3 is an explanatory view of the way in which sinks are prevented from forming in the paint composition according to the present invention.

The reason for these advantages are explained below. When a paint composition containing only a coloring pigment with the total pigment weight composition (PWC) of less than 30% is used in a conventional paint composition, as shown in FIG. 3A-1 and FIG. 3B-1, the coloring pigment 26 is precipitated to a concave portion 24a on the lower coated surface 24. The concave portion 24a corresponds in position to a sink mark of the molding product (not shown). Consequently, a sink is formed in the upper exposed surface 28 of the coating film at a position corresponding to (or covering) the sink mark of the molding product, and an uneven luster (coating film sink marks) appears on the coated surface 28. As shown in FIG. 3A-2, when the amount of the coloring pigment 26 is increased, the coloring pigment 26 fills (seals) the concave portion 24a of the coated surface 24 to decrease, but not eliminate, the unevenness of the luster in the upper surface 28.

Referring now to FIG. 3B-2, although the extender pigment 30 has no hiding power, the extender pigment 30 serves as a precipitation inhibitor to the coloring pigment 26 to increase thixotropy. Therefore, orientation and distribution of the coloring pigment 26 near the surface 28 of the coating layer 14 is made substantially uniform irrespective of the presence or absence of concave portions 24a (caused by sinks in the molding product) at the lower coated surface 24.

Thus, in the event that the coating film is placed over a sink in the surface of a resin molding product, so that the bottom surface of the coating layer conforms to the sink of the resin molding product, the extender pigment will serve as an inhibitor to prevent against the development of luster unevenness in the front surface of the coating film.

Representative extender pigments include, alone or in various combinations, one or more of the following: silica ($SiO_2$), talc ($Mg_3(Si_4O_{10})(OH)_2$), precipitating barium sulfate ($BaSO_4$), barium carbonate ($BaCO_3$), calcium carbonate ($CaCO_3$), alumina white ($Al_2(OH)_3$), and precipitating magnesium carbonate ($MgCO_3 \cdot 3Mg(OH)_2H_2O$). Among these representative extender pigments, silica, talc or a combination of silica and talc is preferred. Silica is particularly preferred since the effect of inhibiting luster unevenness can be obtained even with a small amount of silica blended into the paint composition.

The blending amount of the extender pigment varies depending on the kind of the coloring pigment selected. Characteristics of the coloring pigment that may affect the amount of extender pigment used include the specific gravity and grain shape of the coloring pigment. The blending amount of the extender pigment is preferably more than the amount needed for the extender pigment to inhibit precipitation of the coloring pigment and thereby prevent an uneven luster from developing. At the same time, the blending amount of the extender pigment is preferably not so great that the extender pigment adversely affects the coloring pigment, namely, by impairing the hue of the coating film.

For example, when the extender pigment is silica or a combination of silica and talc, the blending amount of silica is preferably 0.1 part or more per 1 part by weight of the coloring pigment. When talc is used, the blending amount of talc is preferably 1 part by weight or more per 1 part by weight of the coloring pigment. There is no particular restriction on the upper limit to the amount of extender pigment that may be present, except that the total pigment weight concentration (PWC), which includes both the extender pigment and the coloring pigment, should be less than 30%. When the paint composition is applied directly to a resin molding product, or when the invention is applied to a primer, silica is used, preferably in 0.4 parts by weight per 1 part by weight coloring pigment, and talc (in the case of use in combination with silica) is used preferably in 3 parts by weight per 1 part by weight coloring pigment. In addition, when the coloring pigment is blended in a range of from 25% to less than 30%, the extender pigment may be used in blending amounts somewhat smaller than the ranges described above (for example by 10 to 20% smaller than the above-described ranges), since the coloring pigment itself has a sealing effect to some extent.

As shown in FIG. 2, the thus prepared metallic paint is applied on the design surface of the molding main body 12 to form a metallic coating film 14 and, optionally, a clear coating film 16 is then formed on the metallic coating film 14 with a clear paint.

Thus, even when a "sink" is present on the surface of the molding main body, as is frequently the case in practical experience, the paint composition of this invention will allow for the formation of a coating film having an even luster, even in a portion of the coating film overlying the sink.

EXAMPLES

The following examples are offered to further illustrate the beneficial results obtained by use of the paint composition of the present invention. These examples are intended to be exemplary and not exhaustive of the scope of the invention.

Preparation of Resin Molding Product Main Body

A molding body 12 was prepared by extruding a polyolefin resin into a molding product having a cross sectional area as shown in FIG. 1. The double coated tape seat 18 was formed on ribs having heights (extending from the body 12 to the left in FIG. 1) of 0.5 mm and widths (extending top to bottom in FIG. 1) that tapered from 1.0 mm (next to the surface of the molding body 12) to 0.8 mm. The pitch (distance between the centers of adjacent ribs) was 2.3 mm. The mean wall thickness of the molded body was 2.8 mm.

Preparation of Metallic Paint

For the metallic paints of the examples and comparative examples, the formulations were prepared from the following:

TABLE 1

| Component | Compound | Concentration |
| --- | --- | --- |
| Base resin | acryl-urethane resin/chlorinated PP = 2/1 | 30% |
| Coloring pigment | Al foil-containing inorganic/organic mixed pigment) | 2% |

TABLE 1-continued

| Component | Compound | Concentration |
| --- | --- | --- |
| Extender pigment | silica or talc | Varied amount |
| Thinner | Mixture of aromatic and aliphatic hydrocarbons, an ester, a ketone, and an alcohol | Balance |

The amount of extender pigment was blended in the amounts shown in Tables 2 and 3.

Preparation of Test Specimen

For each example and comparative example, the design surface of the resin molding product main body was cleaned with an alcohol (isopropyl alcohol (IPA)), and the metallic paint was sprayed to produce a coating film having a film thickness of 15 $\mu$m. Subsequently, a clear paint was sprayed to produce a film thickness: 20 $\mu$m, then dried at 80° C.×30 min to prepare resin molding products.

The clear paint was prepared as follows. Ten parts by volume of a main agent comprising 40 parts by weight of an acrylpolyol/60 parts by weight of a thinner were diluted with 3 parts by volume of hexamethylene diisocyanate (HMDI) and 3 parts by volume of a thinner, by volume ratio. The thinner of the clear paint was a mixture of an aromatic hydrocarbon, an ester, and a ketone.

Procedures for Testing Properties of Coating Films

For each of the resin molding products, the appearance of its respective coating film was visually observed, and a cross-cut test (JIS K 5400) of each of the coating films was conducted at the initial stage and after a water resistance test, in which the coating film was immersed at 40° C.×240 hr.

The results are shown in Table 2 and 3. Unevenness of luster in the form of coating film sink marks was less likely to occur on the coated surface prepared from the paint composition of the present invention. In addition, significantly increasing the concentration of the extender pigment has an undesired effect on the adhesion of the coating film. Preferably, the parts by weight of the extender pigment per 1 part by weight of coloring pigment is not greater than 0.2 in the case of silica, 3.0 in the case of talc, and 3.5 in the case of a silica:talc combination. It is considered that no problems will arise when a primer is used or the molding product itself is formed by a polar resin material or a resin material in which polar groups are introduced.

The paint composition of the invention produces a coating film that possesses less luster unevenness (i.e., sinks on the coating film) compared to conventional compositions lacking the combination of a coloring pigment and extender pigment with the total pigment PWC of less than 30%.

This is considered to be attributable, as described above, to that the extender pigment's inhibition of the precipitation of the coloring pigment, or increase in the thixotropy of the paint material itself, to inhibit the precipitation of the coloring pigment after the coating, so that the coloring pigment occupies the concave portion of the coated surface and is present on this portion of the coating surface in the same manner as in other portions even if the PWC is not sufficient for inducing a sealing effect.

TABLE 2

|   |   |   | Properties of Coating film | | |
|---|---|---|---|---|---|
|   | Properties of paint | | Unevenness of | Adhesion | |
| Test No. | Extender pigment | Content of Extender pigment (%) | Total pigment PWC (%) | luster in appeaeance (coating film sink marks) | Initial Stage | After water test |
| 1 | — | — | 6.3 | x | 0/100 | 0/100 |
| 2 | Silica (1) | 0.1 (0.05)* | 6.5 | Δ | 0/100 | 0/100 |
| 3 | Silica (1) | 0.3 (0.15)* | 7.1 | o | 0/100 | 0/100 |
| 4 | Silica (1) | 0.5 (0.25)* | 7.7 | o | 1/100 | 3/100 |
| 5 | Talc (2) | 1.0 (0.5)* | 9.1 | x | 0/100 | 0/100 |
| 6 | Talc (2) | 3.0 (1.5)* | 14.3 | o | 0/100 | 0/100 |
| 7 | Talc (2) | 5.0 (2.5)* | 18.9 | o | 0/100 | 0/100 |
| 8 | Talc (2) | 7.0 (3.5)* | 23.1 | o | 5/100 | 10/100 | x: conspicuous coating film sink marks
Δ: somewhat conspicuous coating film sink marks
o: no conspicuous coating film sink marks
( )*: parts per weight of silica or talc based on 1 part by weight of coloring pigment
(1): silicon dioxide produced by Tegusa Co. Ltd.
(2): magnesium silicate produced by Nippon Talk Co. Ltd.

As shown in Table 2, the absence of any extender pigment in Test No. 1 resulted in the appearance of conspicuous coating film sink marks. The use of less than 0.1 parts of silica per parts of silica per parts of coloring pigment (Test. No. 2) and the use of less than 1.0 parts of talc per parts of coloring pigment (Test No. 5) also produced conspicuous coating film sink marks. On the other hand, Test Nos. 3 and 4 contained silica in an amount more than 0.1 parts per weight and Test Nos. 6–8 contained talc in an amount more than 1.0 parts per weight to avoid the appearance of conspicuous sink marks.

As evident from Test Nos. 4 and 8, however, using excess amounts of extender pigment has an adverse effect on the adhesive properties of the coating film.

TABLE 3

| | Properties of paint | | | | | properties of coating film Adhesion | |
|---|---|---|---|---|---|---|---|
| Test No. | Extender pigment | Content of extender pigment (%) Silica | talc | Total pigment PWC (%) | Unevenness of luster in appearance (coating film sink marks) | Initial stage | After water test |
| 9 | Silica (1) 0.1 + talc (2) | 0.1 (0.10)* | 0.1 | 6.2 | o | 0/100 | 0/100 |
| 10 | Silica (1) 0.1 + talc (2) | 0.1 (0.30)* | 0.5 | 7.7 | o | 0/100 | 0/100 |
| 11 | Silica (1) 0.1 + talc (2) | 0.1 (0.55)* | 1.0 | 9.3 | o | 0/100 | 0/100 |
| 12 | Silica (1) 0.1 + talc (2) | 0.1 (2.55)* | 5.0 | 19.1 | o | 0/100 | 0/100 |
| 13 | Silica (1) 0.1 + talc (2) | 0.3 (0.65)* | 1.0 | 14.1 | o | 0/100 | 0/100 |
| 14 | Silica (1) 0.1 + talc (2) | 0.3 (2.65)* | 5.0 | 26.7 | o | 0/100 | 0/100 |
| 15 | Silica (1) 0.1 + talc (2) | 0.4 (0.70)* | 1.0 | 14.5 | o | 0/100 | 0/100 |
| 16 | Silica (1) 0.1 + talc (2) | 0.4 (2.70)* | 5.0 | 27.0 | o | 0/100 | 0/100 |
| 17 | Silica (1) 0.1 + talc (2) | 0.4 (3.70)* | 7.0 | 31.9 | o | 5/100 | 15/100 | x remarkable coating film sink marks
Δ somewhat remarkable coating film sink marks
o no remarkable coating film sink marks
( )*parts per weight of silica and talc based on 1 part by weight of coloring pigment
(1) silicon dioxide produced by Tegusa Co. Ltd.
(2) magnesium silicate produced by Nippon Talk Co. Ltd.

As shown by Test Nos. 9–16, the presence of 0.1 parts per weight or more of silica and talc resulted in no conspicuous coating film sink marks and excellent adhesion, whereas the presence of more than 30 PWC in Test No. 17 had a deleterious affect on adhesion (while not impairing sink mark hiding capability).

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. An organic solvent paint composition for use on a resin molding product having a surface;
   the paint composition comprising an organic solvent, a coloring pigment and an extender pigment, wherein the coloring pigment comprises an inorganic coloring pigment, and wherein the coloring pigment and the extender pigment are collectively present in the paint composition in a total pigment weight concentration (PWC) of less than 30%, and wherein the extender pigment comprises silica present in the paint composition in an amount between 0.1–0.2 parts by weight per 1 part by weight of the coloring pigment.

2. An organic solvent paint composition for use on a resin molding product having a surface;
   the paint composition comprising an organic solvent, a coloring pigment and an extender pigment, wherein the coloring pigment comprises an inorganic coloring pigment, and wherein the coloring pigment and the extender pigment are collectively present in the paint composition in a total pigment weight concentration (PWC) of less than 30%, and wherein the extender pigment comprises talc present in the paint composition in an amount between 1–3 parts by weight per 1 part by weight of the coloring pigment.

3. An organic solvent paint composition for use on a resin molding product having a surface;
   the paint composition comprising an organic solvent, a coloring pigment and an extender pigment, wherein the coloring pigment comprises an inorganic coloring pigment, and wherein the coloring pigment and the extender pigment are collectively present in the paint composition in a total pigment weight concentration (PWC) of less than 30%, and wherein the extender pigment comprises silica and talc and is contained in the paint composition in an amount between 0.1–3.5 parts by weight per 1 part by weight of the coloring pigment.

4. A coated resin molding product comprising:
   a resin molded product having a front surface and a back surface; and
   a coating film coated on the front surface of the resin molded product, wherein the coating film comprises a paint composition, and the paint composition comprises a coloring pigment and an extender pigment that are collectively present in the paint composition in a total pigment weight concentration (PWC) of less than 30%, wherein the coloring pigment comprises an inorganic coloring pigment, and wherein the extender pigment is incorporated into the paint composition with the coloring pigment in an effective amount to prevent coating film sink marks caused by ribs on the back surface of the resin molded product, and wherein the extender pigment comprises silica present in the paint composition in an amount between 0.1–0.2 parts by weight per 1 part by weight of the coloring pigment.

5. A coated resin molding product comprising:
   a resin molded product having a front surface and a back surface; and
   a coating film coated on the front surface of the resin molded product, wherein the coating film comprises a paint composition, and the paint composition comprises a coloring pigment and an extender pigment that are collectively present in the paint composition in a total pigment weight concentration (PWC) of less than 30%, wherein the coloring pigment comprises an inorganic coloring pigment, and wherein the extender pigment is incorporated into the paint composition with the coloring pigment in an effective amount to prevent coating film sink marks caused by ribs on the back surface of the resin molded product, and wherein the extender pigment comprises talc present in the paint composition in an amount between 1–3 parts by weight per 1 part by weight of the coloring pigment.

6. A coated resin molding product comprising:
   a resin molded product having a front surface and a back surface; and
   a coating film coated on the front surface of the resin molded product, wherein the coating film comprises a paint composition, and the paint composition comprises a coloring pigment and an extender pigment that are collectively present in the paint composition in a total pigment weight concentration (PWC) of less than 30%, wherein the coloring pigment comprises an inorganic coloring pigment, and wherein the extender pigment is incorporated into the paint composition with the coloring pigment in an effective amount to prevent coating film sink marks caused by ribs on the back surface of the resin molded product, and wherein the extender pigment comprises silica and talc and is contained in the paint composition in an amount between 0.1–3.5 parts by weight per 1 part weight of the coloring pigment.

7. An organic solvent paint composition for use on a resin molding product having a surface, the paint composition consisting essentially of an organic solvent, a coloring pigment and an extender pigment, wherein the coloring pigment and the extender pigment are collectively present in the paint composition in a total pigment weight concentration (PWC) of less than 30%, and silica is present in the paint composition in an amount between 0.1–0.2 parts be weight per 1 part by weight of the coloring pigment.

8. An organic solvent paint composition for use on a resin molding product having a surface the paint composition consisting essentially of an organic solvent, a coloring pigment and an extender pigment, wherein the coloring pigment and the extender pigment are collectively present in the paint composition in a total pigment weight concentration (PWC) of less than 30%, and talc is present in the paint composition in an amount between 1–3 parts by weight per 1 part by weight of the coloring pigment.

9. An organic solvent paint composition for use on a resin molding product having a surface the paint composition consisting essentially of an organic solvent, a coloring pigment and an extender pigment, wherein the coloring pigment and the extender pigment are collectively present in the paint composition in a total pigment weight concentration (PWC) of less than 30%, and the extender pigment comprises silica and talc and is contained in the paint composition in an amount between 0.1–3.5 parts by weight per 1 part by weight of the coloring pigment.

10. A coated resin molding product consisting essentially of:
- a resin molded product having a front surface and a back surface; and
- one coating film coated on the front surface of the resin molded product, wherein:
    - the coating film comprises a paint composition;
    - the paint composition comprises a coloring pigment and an extender pigment that are collectively present in the paint composition in a total pigment weight concentration (PWC) of less than 30%;
    - the extender pigment is incorporated into the paint composition with the coloring pigment in an effective amount to prevent coating film sink marks caused by ribs on the back surface of the resin molded product;
    - the coloring pigment comprises an inorganic pigment; and
    - silica is present in the paint composition in an amount between 0.1–0.2 parts by weight per 1 part by weight of the coloring pigment.

11. A coated resin molding product consisting essentially of:
- a resin molded product having a front surface and a back surface; and
- one coating film coated on the front surface of the resin molded product, wherein:
    - the coating film comprises a paint composition;
    - the paint composition comprises a coloring pigment and an extender pigment that are collectively present in the paint composition in a total pigment weight concentration (PWC) of less than 30%;
    - the extender pigment is incorporated into the paint composition with the coloring pigment in an effective amount to prevent coating film sink marks caused by ribs on the back surface of the resin molded product;
    - the coloring pigment comprises an inorganic pigment; and
    - talc is present in the paint composition in an amount between 1–3 parts by weight per 1 part by weight of the coloring pigment.

12. A coated resin molding product consisting essentially of:
- a resin molded product having a front surface and a back surface; and
- one coating film coated on the front surface of the resin molded product, wherein:
    - the coating film comprises a paint composition;
    - the paint composition comprises a coloring pigment and an extender pigment that are collectively present in the paint composition in a total pigment weight concentration (PWC) of less than 30%;
    - the extender pigment is incorporated into the paint composition with the coloring pigment in an effective amount to prevent coating film sink marks caused by ribs on the back surface of the resin molded product;
    - the coloring pigment comprises an inorganic pigment; and
    - the extender pigment comprises silica and talc and is contained in the paint composition in an amount between 0.1–3.5 parts by weight per 1 part by weight of the coloring pigment.

* * * * *